United States Patent [19]
Thornton et al.

[11] 3,877,833
[45] Apr. 15, 1975

[54] HOLE CUTTER

[75] Inventors: George E. Thornton, Athens; Danvis T. Newby, Huntsville, both of Ala.

[73] Assignee: The United States of America as represented by the Administrator of the National Aeronautics and Space Administration, Washington, D.C.

[22] Filed: Sept. 19, 1973

[21] Appl. No.: 398,901

[52] U.S. Cl. ............... 408/186; 408/112; 408/193; 408/195
[51] Int. Cl. ........................................... B23b 51/04
[58] Field of Search ........... 408/186, 193, 195, 196, 408/197, 198, 95, 96, 97, 112

[56] References Cited
UNITED STATES PATENTS

| | | | |
|---|---|---|---|
| 769,200 | 9/1904 | Uschold | 408/112 |
| 2,527,968 | 10/1950 | Sherman et al. | 408/112 X |
| 2,628,512 | 2/1953 | Lankford | 408/198 |
| 3,065,654 | 11/1962 | Critelli et al. | 408/112 |

*Primary Examiner*—Leonidas Vlachos
*Attorney, Agent, or Firm*—Wayland H. Riggins; L. D. Wofford, Jr.; John R. Manning

[57] ABSTRACT

An adjustable hole cutter for use in forming circular openings in workpieces. The hole cutter is characterized by a mount of a substantially planar configuration, positionable into a plane paralleling the working plane of a selected workpiece, a shaft for imparting rotary motion to the mount about an axis of rotation normally related to the working plane, a plurality of stabilizing struts for resiliently supporting the mount in parallelism with the working plane as rotary motion is imparted thereto, a drill bit for drilling a pilot hole concentric with the axis of rotation, and an elongated cutting tool adjustably seated within a radially extended slot.

9 Claims, 6 Drawing Figures

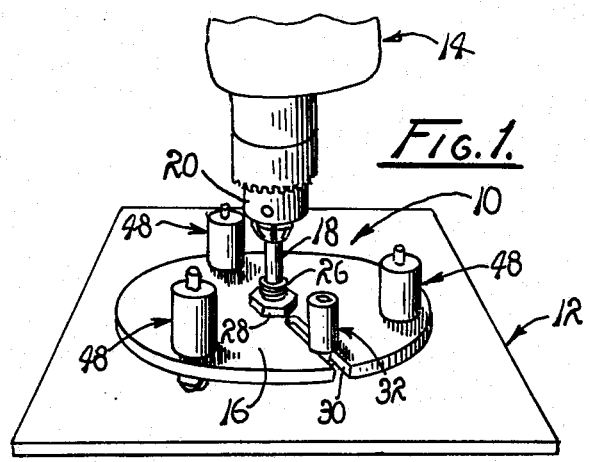
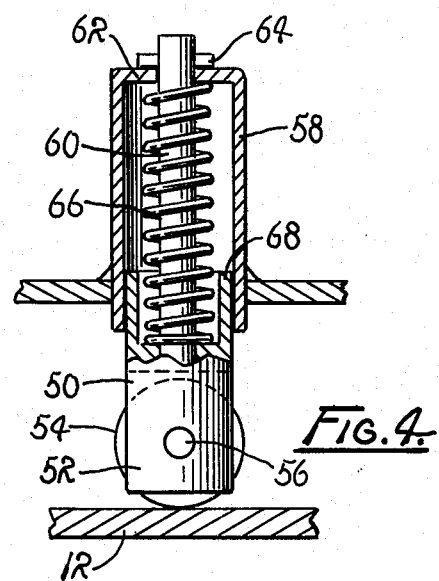
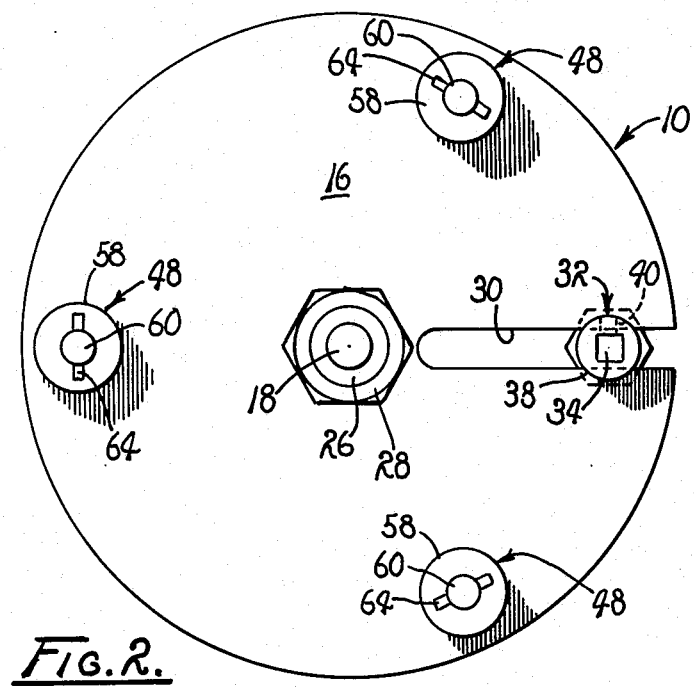
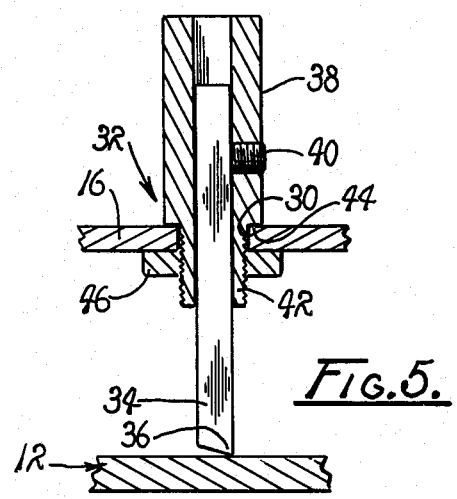
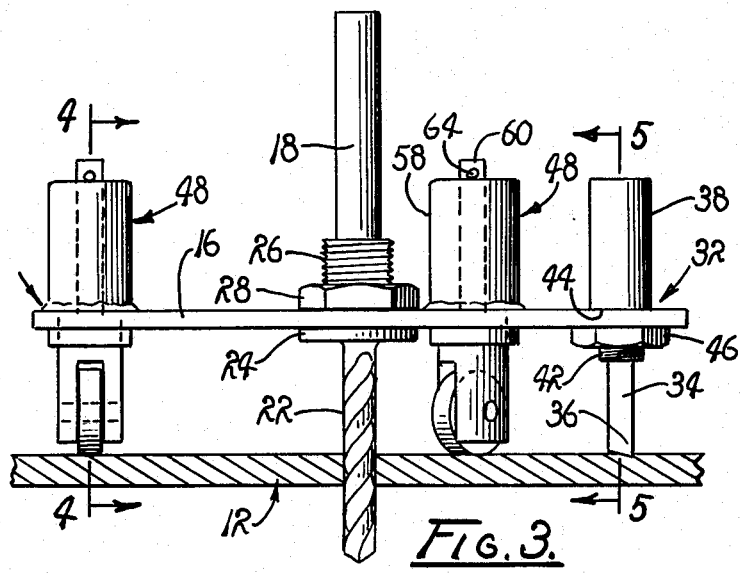
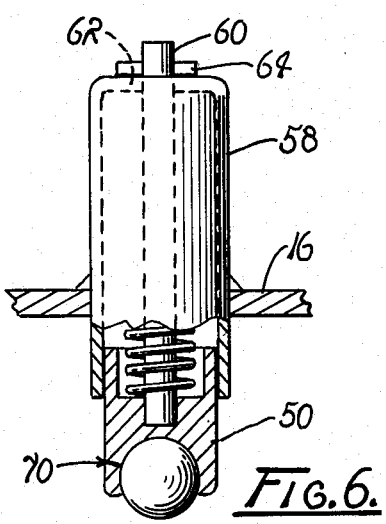

HOLE CUTTER

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates to devices for cutting openings in workpieces and more particularly to an improved adjustable hole cutter for use in forming circular openings in workpieces.

Heretofore, various types of cutters have been devised for cutting circular openings in workpieces formed of both metallic and non-metallic materials. One type of cutter often employed is the so-called "hole saw" which includes an endless saw blade seated about the periphery of a supporting disk and driven in rotation by a drill motor or the like. Such devices normally are not adjustable, are very difficult to sharpen, are readily fouled by chips, dust and similar debris. Moreover, such devices have a fixed diameter so that holes of only a single dimension can be cut.

Another type of hole saw or circular cutter is typified by the device disclosed in U.S. Letters Pat. No. 3,124,182, issued to Howard Silken Mar. 10, 1964. This device includes a bit, driven by a drill motor, which penetrates the workpiece and functions as a side cutter to form a circular cut. While such devices are readily adjustable for cutting holes of different diameters, the device requires a substantial amount of effort and skill in properly advancing the cutting bit along a circular path. Further, certain apparent difficulties are encountered when employing this and similar devices for cutting holes in metallic stock materials.

Another cutting tool is typified by the tool shown in U.S. Letters Pat. No. 1,270,254, issued to Christopher Bach, Jr. June 25, 1918. This cutter employs a knife blade which, of course, is not designed for high-speed performance and simply is not intended for use in cutting metals.

Another tool is typified by the tool shown in U.S. Letters Pat. No. 2,463,024 which employs an eccentric cutting tool. It is important to note that while a tool having a single cutting member eccentrically related with the tool's axis of rotation can be easily sharpened, employed without fouling and can readily be adjusted for cutting holes of different diameters, difficulty often is encountered in supporting the mount for the tool in substantial parallelism with the working plane. Thus, there is a propensity for the mount to tip relative to the working plane with an attendant loss of tool control.

It should therefore be apparent that hole cutters heretofore available simply do not completely satisfy existing needs. It is therefore the general purpose of the instant invention to provide a hole cutter for use in forming circular openings, of selected diameters, in workpieces, of both metallic and non-metallic materials, and which can be one which can be sharpened quite readily and employed without being fouled by debris created while performing cutting operations.

OBJECTS AND SUMMARY OF THE INVENTION

It is therefore the object of the instant invention to provide a hole cutter for use in forming circular openings in workpieces.

It is another object to provide an adjustable hole cutter for use in forming circular openings having preselected diameters.

It is another object to provide an adjustable hole cutter for use in accurately forming circular openings with minimal skill.

It is another object to provide an adjustable hole cutter particularly suited for use in performing high-speed cutting operations without experiencing loss of tool control.

These and other objects and advantages are achieved through the use of an adjustable hole cutter including a mount, a shank extended from the mount and configured to be received within the chuck of a drill motor, a drill bit coaxially aligned with the shank for forming a centering hole, an elongated cutting tool radially spaced from the drill bit and a plurality of supports for resiliently supporting the mount in substantial parallelism with the working plane as the cutting tool is advanced along an arcuate path in the working plane for forming a circular opening, as will hereinafter become more readily apparent by reference to the following descriptions and claims in light of the accompanying drawings.

BRIEF DESCRIPTION OF THE DRAWINGS

FIG. 1 is a perspective view of a hole cutter embodying the principles of the instant invention, depicting one manner in which the hole cutter is employed for cutting circular openings.

FIG. 2 is a top plan view, on an enlarged scale, of the hole cutter shown in FIG. 1.

FIG. 3 is a side elevation of the hole cutter, illustrating the relationship of a cutting tool with a plurality of resilient stabilizing struts.

FIG. 4 is a partially sectioned view of one of a first form of stabilizing struts, taken generally along line 4—4 of FIG. 3.

FIG. 5 is a partially sectioned elevational view of the cutting tool, taken generally along line 5—5 of FIG. 3.

FIG. 6 is a partially sectioned fragmentary view of the modified form of stabilizing struts provided for supporting the tool mount.

DESCRIPTION OF THE PREFERRED EMBODIMENT

Referring with more specificity to the drawings, wherein like reference characters designate like or corresponding parts throughout the several views, there is shown in FIG. 1 a hole cutter 10 which embodies the principles of the instant invention.

The hole cutter 10, as depicted in FIG. 1, is disposed in an operative disposition relative to the working plane of a workpiece 12. As herein employed, the term working plane refers to the plane of the kerf formed by the cutting tool. The cutter 10 is driven by a drill motor 14, provided for imparting rotary motion to the hole cutter 10. It is to be understood that the particular drill motor employed forms no part of the instant invention. While the hole cutter 10 is particularly suited for use with portable, hand-held drill motors, drill motors for stationary drill presses can be employed equally as well.

A tool mount 16 of a substantially disk-shaped configuration serves as a base for the hole cutter 10. While the tool mount 16 is of a disk-shaped configuration, it is to be understood that the suitable configuration can be employed equally as well. For example, a mount having a configuration conforming to that of a so-called spider functions quite satisfactorily.

Extended from the tool mount 16, normal to the plane thereof, there is a shank 18 configured to be received within a chuck 20 of the drill motor 14. The chuck serves to couple the hole cutter 10 to the drill motor in a manner well understood by those familiar with the operation of drill motors, whereby the drill motor 14 is readied to impart rotary motion to the tool mount 16, via the shank 18.

Referring now to FIG. 3, a drill bit 22 is coaxially aligned with the shank 18 and rigidly affixed to the tool mount 16, in any suitable means, as by welding, for example. The bit 22 serves to form a centering hole, not designated. As a practical matter, the shank 18 and the drill bit 22 may be a unitary member extended through an opening, not designated, formed in the plate 16. In such instances, a stop collar 24 is welded or otherwise rigidly secured to the drill bit 18, while a nipple 26 is welded or otherwise rigidly secured to the shank 18 for receiving a screw-threaded jamb-nut 28. The nut 28 is torqued sufficiently for forcing the adjacent surfaces of the stop collar 24 and the jamb-nut 28 into a locking engagement with the adjacent surfaces of the tool mount 16.

As best shown in FIG. 2, the tool mount 16 also includes a radial slot 30 within which is seated a cutting tool, generally designated 32. The slot 30 extends from near the center of the tool mount 16 to the periphery thereof and accommodates radial displacement of the cutting tool therealong for adjustment purposes. Accordingly, it is to be understood that the cutting tool 32 is repositionable along the radial slot 30 for varying the spacing of the cutting tool from the axis of rotation whereby the diameter of the circular opening cut by the hole cutter 10 may selectively be varied.

As shown in FIG. 5, the cutting tool 32 includes a depending blade 34 having a lip 36 ground at a suitable angle for purposes of penetrating the surface of the workpiece 12. Of course, the angle to which the lip is ground is dictated, in part, by the particular material from which the workpiece is formed. The blade 34 serves to form a kerf in the surface of the workpiece, as lateral motion is imparted to the blade.

Since cutting tools employ such blades, as is well known, a detailed description of the blade 34 is omitted in the interest of brevity. However, it is to be understood that the blade 34 is received within a bore, not designated, of a chuck 38. A screw-threaded setscrew 40 is provided for securing the blade 34 within the chuck 38. The chuck 38 also includes, at its base, an externally threaded terminal segment 42 terminating at an annular shoulder 44. The segment 42 is of a diameter substantially equal to the width of the radial slot 30 so that the shoulder 44 engages the adjacent planar surfaces of the tool mount 16 and functions as a supporting shoulder for the chuck 38. An internally threaded jamb-nut 46 is received by the terminal segment 42 of the chuck 38, at the surface of the mount 16 opposite that engaged by the shoulder 44. This nut serves to interlock the chuck 38 with the tool mount 16, through frictional engagement, as the nut 46 is advanced along the threaded surface of the terminal segment 42 of the chuck 38 into engagement with the adjacent surface of the mount. Thus, a repositioning of the cutting tool 32 along the radial slot 30 is facilitated simply by releasing the jamb-nut, repositioning the chuck and thereafter tightening the jamb-nut for securing the chuck 38 in place, relative to the slot 30.

In order to impart stability to the mount, a plurality of stabilizing struts 48 are rigidly affixed at equidistances about the periphery of the tool mount 16, with one strut being disposed in diametric opposition with the cutting tool 32. As shown in FIG. 4, each of the struts 48 includes a spring-biased support 50 which terminates in a yoke 52. Within the yoke there is seated a wheel 54. The wheel 54, in turn, is pinned to the yoke 52 through a use of a suitable axle 56. The support 50 is telescopically received within a tubular shroud 58 extended through a suitable opening, not designated, formed in the mount 16 and welded or otherwise rigidly affixed thereto. A guide pin 60 integral with the support 50 is extended through a suitable opening, also not designated, formed in a closure plate 62 provided for the shroud 58. A stop pin 64 is affixed to the distal end of the guide pin 60 and serves to preclude an extraction of the pin from the opening formed in the closure plate 62.

Within the shroud 58 there is provided, in concentric relation with the guide pin 60, a helical compression spring 66. The spring 66 is seated in a cup 68 formed within the support 50 in circumscribing relation with the base portion of the guide pin 60. The spring 66 abuts the inner surface of the end plate 62 of the shroud 58 and thus continuously urges the support in displacement away from the tool mount 16. Thus, the support 50 is afforded spring-biased telescopic reciprocation relative to the shroud 58. The struts 48 serve as support members for resiliently supporting the tool mount 16 against inclination relative to the working plane of the workpiece 12 as rotary motion is imparted to the mounting member 16. Hence, the lip 36 of the blade 34 is permitted to penetrate the surface of the workpiece 12 as force is applied in a vertical direction to the shank 18 so that control thereof is readily maintained, while displacement of the cutting blade 34 along a circular path is accommodated.

In some instances, it has been found preferable to employ a ball-and-socket combination, designated 70, FIG. 6, for supporting the strut 48 in lieu of a wheel as illustrated in FIG. 4. Among the advantages realized through the employment of the ball and socket 70 for supporting the strut 48 is that of maintaining point contact with the surface of the workpiece 12. Moreover, omnidirectional rotation of the supporting surfaces for the struts 48 is thus facilitated. It is to be understood that the ball-and-socket combination can be fabricated in any suitable manner so long as the ball is permitted to engage the surface of the workpiece. It is to be further understood that the struts 48 whether supported by a yoke 52 and wheel 54, as illustrated in FIG. 4, or the ball and socket 70, as shown in FIG. 6, impart a stabilizing effect to the tool mount 16 as the mount is driven in rotation for cutting a circular opening in a workpiece 12 so that control over the operation of the cutting tool 32 is enhanced.

OPERATION

It is believed that in view of the foregoing description, the operation of the device will readily be understood and it will be briefly reviewed at this point.

With the hole cutter 10 assembled in the manner hereinbefore described, it is readied intersecting use in cutting circular openings of preselected diameters in a workpiece 12 by repositioning the cutting tool within the radial slot 30 and securing the cutting tool in place by tightening the nut 46. Thereafter, the drill motor 14 is coupled with the hole cutter 10 by securing the shank 18 within the chuck 20. The drill motor 14 is now prepared to serve as a source of energy for both rotary and linear forces employed in driving the cutting tool 32. Once the hole cutter 10 is positioned above a workpiece 12, and linear motion, along a path intersection the working plane, and rotary motion, about an axis substantially normal to the working plane, are simultaneously imparted to the hole cutter, the bit 22 forms a centering opening, not designated, in the workpiece 12. Continued rotary and linear motion of the cutter 10 causes the stabilizing struts 48 to engage the outer surface of the workpiece 12, whereupon the spring-biased support 50 is forced inwardly into the shroud 58 and the lip 36 of the blade 34 forcibly penetrates the surface of the workpiece. The stabilizing struts 48 at all times impart stability to the tool mount 16. This stability enhances the control achieved over the tool 32 as the tool is advanced by the drill motor 14 for forming a circular opening in the workpiece. Due to the fact that the cutting tool 32 employs a single blade having a cutting lip, the hole cutter 10 can be driven at relatively high speeds without becoming fouled by chips and the like.

In view of the foregoing, it should readily be apparent that the hole cutter 10 of the instant invention serves to solve perplexing problems of providing a hole cutter for rapidly and accurately forming holes of varying diameters while utilizing minimal skill.

Although the invention has been herein shown and described in what is conceived to be the most practical and preferred embodiment, it is recognized that departures may be made therefrom within the scope of the invention, which is not to be limited to the illustrative details disclosed.

We claim:

1. An adjustable hole cutter for use in forming circular openings in workpieces comprising:
    a tool mount positionable into a plane paralleling the working plane of a selected workpiece;
    means for imparting rotary motion to said mount about an axis of rotation normal to the working plane;
    support means affixed to said mount for resiliently supporting the mount against displacement along a linear path extended toward the workpiece as rotary motion is imparted to the mounting member;
    a elongated cutting tool;
    means for affixing said cutting tool to said mount in a projected relationship therewith for engaging the workpiece as the mount is displaced along the linear path;
    said support means including a plurality of stabilizing struts affixed to the mount, and a plurality of spring-biased supports including strut-supporting rollable elements mounted on said struts for engaging selected portions of the surface of the workpiece.

2. The hole cutter of claim 1 wherein said rollable elements comprise wheels.

3. The hole cutter of claim 1 wherein said rollable elements comprise balls.

4. The hole cutter of claim 1 wherein said means for imparting rotary motion to said mount includes an elongated shank rigidly affixed to the mount and extended in concentric relation with said axis of rotation.

5. The hole cutter of claim 4 further comprising a drill bit rigidly affixed to said mount in coaxial alignment with said shank for drilling a centering hole in the workpiece as the mount is displaced along said linear path.

6. The hole cutter of claim 5 wherein said shank is configured to be received within a chuck of a drill motor.

7. The hole cutter of claim 1 wherein said mount is of a disk-shaped configuration and said means for affixing said cutting tool to the mount includes means defining a radially extended slot for receiving said cutting tool, whereby the cutting tool in affixed to said mount at a variable distance from said axis.

8. The hole cutter of claim 2 wherein each of said spring-biased wheels is supported by means including:
    A. a bifurcated yoke;
    B. an axle-supported wheel seated in the yoke;
    C. a guide pin affixed to said yoke extended in parallelism with said axis of rotation;
    D. a shroud of a cylindrical configuration receiving said guide pin in a concentric relationship therewith;
    E. a compression spring seated on said yoke and disposed within said shroud, concentrically related to said guide pin for forcing said yoke outwardly from said shroud; and
    F. means including a motion-limiting pin affixed to said guide pin and supporting said guide pin against displacement from the shroud.

9. The hole cutter of claim 8 wherein said means for affixing said cutting tool to said mount includes means for adjusting the effective length of the cutting tool.

* * * * *